3,553,297
PREPARATION OF 2-CHLORO-1-(2,4,5-TRICHLORO-PHENYL)VINYL DIMETHYL PHOSPHATE
David E. Ramey, Modesto, Calif., assignor to Shell Oil Company, New York, N.Y., a corporation of Delaware
No Drawing. Filed Sept. 20, 1968, Ser. No. 761,285
Int. Cl. C07f 9/08
U.S. Cl. 260—969                 8 Claims

ABSTRACT OF THE DISCLOSURE

Production of the insecticide, 2 - chloro-1-(2,4,5-trichlorophenyl)vinyl dimethyl phosphate, by reaction of trimethyl phosphite selectively with 2,2,2′,4′,5′-pentachloroacetophenone in a mixture of isomeric pentachloroacetophenones is effected by carrying out the reaction in a liquid alkane as reaction medium.

BACKGROUND OF THE INVENTION

Field of the invention

This invention comprises an improved process for the production of 2-chloro-1-(2,4,5-trichlorophenyl)vinyl dimethyl phosphate, marketed commercially as Gardona® insecticide.

Description of the prior art

The preparation of 2-chloro-1-(2,4,5-trichlorophenyl)vinyl dimethyl phosphate by the reaction of trimethyl phosphite with neat 2,2,2′,4′,5′-pentachloroacetophenone is described in Example I of U.S. Pat. No. 3,102,842. This reaction is shown by the equation:

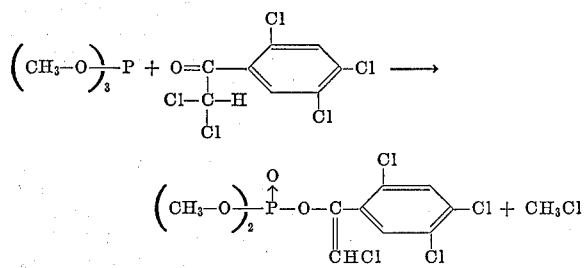

U.S. Pat. No. 2,956,073 suggests the use of an inert diluent or solvent such as a hydrocarbon to moderate and control the rate of the exothermic reaction of a trialkyl phosphite with an alpha-polyhalogeno ketone.

SUMMARY OF THE INVENTION 2,2,2′,4′,5′-pentachloroacetophenone is ordinarily prepared by Friedel-Crafts ketone synthesis, viz by reaction of 1,2,4-trichlorobenzene with dichloroacetyl chloride in the presence of aluminum chloride followed by decomposition of the resulting complex with ice and hydrochloric acid. Invariably some of the isomeric 2,2,2′,3′,6′-pentachloroacetophenone is formed. The presence of this isomer is highly undesirable, since it too reacts with trimethyl phosphite to form 2 - chloro-1-(2,3,6-trichlorophenyl)vinyl dimethyl phosphate. Both this phosphate and its ketone precursor produce a very marked hormonal effect on certain crops such as cotton, grapes, tobacco, and melons. This effect is similar to that exhibited by hormonal-type weed killers and may cause retardation in growth or may kill sensitive crops. This undesirable hormonal effect is greatly reduced or not shown if the phytotoxic isomer is present in concentrations less than one percent by weight. It has been found that it is very difficult to separate the 2′,4′,5′-ketone isomer from the 2′,3′,6′-ketone isomer by distillation. It has been found necessary to employ a multiple crystallization technique to effect the separation after the ketone isomers have been reacted to form the phosphates. This technique is operationally difficult to employ on a large scale and results in a significant reduction in yield if the necessary low level of the phytotoxic isomer is to be attained.

It has now been found that when trimethyl phosphite is reacted with the mixture of pentachloroacetophenone isomers in the presence of a liquid alkane as diluent, little if any of the 2,2,2′,3′,6′-pentachloroacetophenone isomer is converted to its respective vinyl phosphate. Moreover, the desired 2,4,5-phosphate isomer is relatively insoluble in the alkane reaction medium, while the undesired 2′,3′,6′-ketone isomer is significantly more soluble and is carried away when the reaction medium is removed from the 2,4,5-phosphate product. The overall result of these two phenomena is that the phytotoxic 2,3,6-isomer content is reduced to tolerable levels. The process of this invention, therefore, eliminates the need for the recrystallization step and provides an operationally efficient and readily conducted process for the preparation of a suitable 2-chloro-1-(2,4,5-trichlorophenyl)vinyl dimethyl phosphate product on a commercial scale.

Thus, generally this invention is an improved process for the production of 2-chloro-1-(2,4,5-trichlorophenyl) vinyl dimethyl phosphate by reaction of trimethyl phosphite selectively with 2,2,2′,4′,5′-pentachloroacetophenone in a mixture of isomeric pentachloroacetophenones by carrying out the reaction in a liquid alkane as the reaction medium.

DESCRIPTION OF THE PREFERRED EMBODIMENTS

When 2-chloro-1-(2,4,5-trichlorophenyl)vinyl dimethyl phosphate is prepared by the method set forth in U.S. Pat. No. 3,102,842, no solvent or reaction medium is used. Since the phosphate is a solid below about 95° C., it is necessary, when using the disclosed process, to maintain the reaction temperature above about 95° C. in order to have a fluid reaction mass. When the reaction is carried out in this manner, a significant amount of the 2,3,6-phosphate isomer is formed.

While the reaction product from small scale preparations may often be cooled to room temperature without crystallization, large batches will generally crystallize upon cooling, possibly after supercooling, into unmanageable solid masses.

The molten reaction product may be recovered in a granular crystalline form which is easily handled by using trimethyl phosphite in quantities significantly in excess of the amount necessary to complete the reaction. The phosphates will then crystallize upon cooling to form a fluid manageable slurry. Alternatively, less trimethyl phosphite may be used and the molten reaction product mixed into some carrier, or solvent such as a liquid lower alkane or ether, in which it is insoluble or from which it may be crystallized to obtain a fluid slurry. The slurries may then be filtered to recover the solid product. Either method of crystallization does not, however, sufficiently reject the phytotoxic 2,3,6-phosphate isomer and the product must be recrystallized at a substantial yield loss to reduce the content of the phytotoxic compounds to a level safe for sensitive plants.

If, however, the pentachloroacetophenones are mixed with a liquid alkane prior to the reaction with approximately stoichiometric amounts of trimethyl phosphite at temperatures of 40–70° C., three unexpected advantages are gained. First, very little if any of the 2,2,2′,3′,6′-pentachloroacetophenone is reacted to form the corresponding phytotoxic phosphate; second, the phytotoxic 2′,3′,6′-ketone is relatively soluble in the alkane, while the desired 2,4,5-phosphate is relatively insoluble, with the result that the 2′,3′,6′-ketone is selectively extracted from the 2,4,5-phosphate when the reaction mass is cooled at the completion of the reaction to obtain complete crystallization of the 2,4,5-phosphate; and third, the amount of trimethyl phosphite required to drive the reaction to completion is significantly reduced.

Use of the liquid alkane reaction medium allows the reaction to be carried out at about 50–65° C. It has been discovered that the 2,2,2',3',6'-pentachloroacetophenone isomer is very unreactive with trimethyl phosphite at this lower temperature, while the 2',4',5'-ketone isomer remains nearly as reactive as at the higher temperature used for neat reactions. The result is a mixture in which content of the 2,3,6-phosphate and ketone isomers is very low.

At the completion of the reaction, most of the 2,4,5-isomer will have crystallized from the alkane reaction medium in which it is relatively insoluble. When cooled to complete the crystallization of the 2,4,5-isomer, most of the more soluble 2',3',6'-ketone isomer will remain dissolved in the alkane. Consequently, because less of the 2,3,6-phosphate is formed and because the unreacted 2',3',6'-ketone remains dissolved in the reaction medium when it is filtered from the crystalline reaction product, high purity (about 95 percent by weight) 2 - chloro-1-(2,4,5-trichlorophenyl)vinyl dimethyl phosphate containing less than one percent by weight of the 2',3',6'-ketone and phosphate is recovered from the reaction mass. This high grade product requires no recrystallization step to remove phytotoxic isomers before it may be safely used on most plants as an insecticide.

An additional benefit conferred by the improved process of this invention is that since the 2',3',6'-ketone isomer remains unreacted, the amount of trimethyl phosphite needed to drive the reaction of the 2',4',5'-ketone isomer to completion is only slightly if any in excess of the amount theoretically necessary to react with only the 2',4',5'-isomer. Typically, this amount of trimethyl phosphite is 100–105 percent molar of the amount of the 2,2,2',4',5'-pentachloroacetophenone present.

Without the alkane reaction medium the amount of trimethyl phosphite required to drive the reaction to completion is typically about 20–30 percent molar in excess of the amount theoretically necessary for all the acetophenones contained in the starting material. Thus, use of a liquid alkane as reaction medium results in a considerable reduction in the amount of trimethyl phosphite consumed in the production of 2-chloro - 1 - (2,4,5-trichlorophenyl)vinyl dimethyl phosphate.

Since the liquid alkane reaction medium is present at the completion of the reaction to form a slurry with the crystalline phosphate reaction product, the need for excess unreacted trimethyl phosphite to perform this function is also eliminated.

Therefore, particularly in terms of commercial scale production, the use of the process of this invention allows a very significant reduction in the requirements for trimethyl phosphite both by reducing the amount consumed in the reaction itself and by eliminating the need for excess trimethyl phosphite to form a slurry with the crystalline reaction product; this in addition to resulting in a greater overall yield of a product which contains the phytotoxic 2,3,6-isomers at tolerable levels.

The reaction incorporating the improvement of the invention may be conveniently conducted by mixing together the liquid alkane and the mixture of pentachloroacetophenones in the reaction vessel. The mixture is heated with stirring to about 50° C., when addition of the trimethyl phosphite is begun. The addition rate and the heating or cooling is adjusted to maintain the reaction temperature between about 50–65° C. although the temperature may suitably range from about 40–70° C. When approximately 50 to 70 percent of the trimethyl phosphite has been added, some 2-chloro-1-(2,4,5-trichlorophenyl) vinyl dimethyl phosphate crystals are charged to the reaction mixture to insure against any possibility of supercooling. Trimethyl phosphite addition is continued to completion. Stirring at about 50–65° C. is continued after the addition of the trimethyl phosphite for about 15 to 45 minutes. The reaction mixture is then cooled to about 25° C. and the resulting slurry is filtered to recover the solid vinyl phosphate which is washed with a small amount of the alkane and then dried.

Alkanes which are suitable as the reaction medium must exhibit a high solubility for the acetophenones at the reaction temperature and low solubility for the 2-chloro-1-(2,4,5-trichlorophenyl)vinyl dimethyl phosphate at about 20–50° C. They must also be liquid at the crystallization temperature and should be easily removed from the vinyl phosphate to facilitate drying it. Generally acyclic alkanes containing 5–20 carbon atoms exhibit these properties and therefore are suitable. Preferred are those alkanes having 5–10 carbon atoms, i.e. pentane, hexane, heptane, octane, nonane, decane, and the like; more preferably pentane, hexane and heptane; hexane being particularly preferred.

The amount of alkane used is critical because as the amount of alkane in the reaction mixture increases, the recovery of the desired vinyl phosphate decreases. Suitably, the amount of alkane may range as low as fourteen percent by weight or less to sixty-five percent by weight or more of the reaction mixture. It is preferred that the amount of alkane be about thirty-five to forty-five percent by weight of the reaction mixture, as this ratio results in a high recovery of the desired product which contains very little of the phytotoxic compounds.

The reaction temperature should not rise above 70° C. in order to prevent reacting more than a minimal amount of the 2',3',6'-ketone isomer.

The crystallization temperature may suitably range from about 0–50° C. although when hexane is used as the alkane 20–30° C. is preferred.

The following examples show the preparation of 2-chloro-1-(2,4,5-trichlorophenyl)vinyl dimethyl phosphate neat and with hexane as the alkane reaction medium.

EXAMPLE I

Preparation neat (A) To a three-neck flask equipped with a stirrer, thermometer, addition funnel and condenser, unpurified pentachloroacetophenone, 92.6 grams [79 percent by weight (%w.), 0.250 mole of 2,2,2',4',5' - pentachloroacetophenone, 9%w. of 2',3',6'-isomer], was added and heated with stirring to 50° C. Addition of trimethyl phosphite, 32.2 grams (0.262 mole), was begun with the temperature maintained at about 50° C. Crystallization began when approximately 90%v. of the trimethyl phosphite had been added. The temperature was raised to 83° C. to liquify the reaction mixture and the remaining trimethyl phosphite was added rapidly at 83° C. Total addition time was 12 minutes. Stirring at 83° C. was continued for an additional 15 minutes after which the hot reaction mixture was stirred into 115 milliliters of hexane. After cooling to 23° C., the solid was collected by filtration and it was washed with 90 milliliters of hexane and dried. The dried solid weighed 87.1 grams and analysis indicated the following:

Purity by infrared—95%w., the desired 2,4,5-phosphate isomer; approximately 1%w. of the 2,3,6 - phosphate isomer and its acetophenone precursor.

Yield of the desired 2,4,5 - phosphate isomer—90.4% molar.

(B) In a second larger scale preparation, unpurified pentachloroacetophenone, 1025 grams (79%w., 2.77 moles 2',4',5'-isomer, 10%w., 0.35 mole 2',3',6'-isomer), was heated to 80° C. Trimethyl phosphite, 478 grams, 3.85 moles (23% molar excess over total acetophenones), was added in 40 minutes at 80–90° C. The reaction mixture was stirred for an additional 2.5 hours at 90–100° C.

Volatiles were removed by stripping under vacuum at 100° C. at 1 torr. One hundred seventy-seven grams of this stripped reaction product were stirred into 177 milliliters of hexane and cooled, with stirring, to 25° C. for 3 hours. The solid was collected by filtration, washed with 100 milliliters of hexane, and dried. Analysis indicated the following:

Purity by infrared—91%w. the desired 2,4,5 - phosphate isomer; 4%w. the 2,3,6-phosphate isomer and its acetophenone precursor.
Yield—91% molar of the desired 2,4,5-phosphate isomer.

EXAMPLE II

Hexane as the reaction medium (A) Using identical equipment and other portions of the same starting material as in Example I (A), unpurified pentachloroacetophenone, 92.6 grams (0.250 mole) and hexane, 115 milliliters, were combined. Addition of trimethyl phosphite, 33.2 grams (0.262 mole), was begun at 22° C. and the temperature was allowed to rise to 50° C. Addition time was 12 minutes. Precipitation of the product began when about 80%v. of the trimethyl phosphite had been added. Stirring at 50° C. was continued for an additional 0.5 hour before the reaction mixture was cooled to 22° C. for 0.5 hour. The solid was collected by filtration, washed with 90 milliliters of hexane and dried. The dried solid weighed 85.5 grams and analysis indicated as follows:

Purity by infrared—99%w. the desired 2,4,5-phosphate isomer; less than 1%w. of the 2,3,6-phosphate isomer and its acetophenone precursor.
Yield—92.5% molar of the desired 2,4,5-phosphate isomer.

(B) In a second larger scale preparation unpurified pentachloroacetophenone, 14.8 lb. (79%w., 17.5 moles 2',4',5'-isomer) and 8 liters of hexane were added to a five-gallon Pfaudler reactor equipped with a stirrer, thermometer, and reflux condenser. The temperature was brought to 50° C. and trimethyl phosphite, 5.1 lb., 18.4 mole (5% molar excess over the 2',4',5'-isomer content of the pentachloroacetophenone mixture) was added with stirring in 2.8 hours, at 50-65° C. Stirring was continued for an additional 0.25 hour at 65° C. The mixture was cooled with stirring to 25° C. and held there for 2 hours. The slurry was drained into a filter and the reactor and solid product were washed each of two times with 3 liters of hexane. The dried product weighed 13.1 lbs. Analysis indicated the following:

Purity by infrared—96%w. the desired 2,4,5-phosphate isomer; less than 1%w. the 2,3,6-phosphate isomer and its acetophenone precursor.
Yield—89% molar of the desired 2,4,5-phosphate isomer.

I claim as my invention:
1. In the process for the preparation of 2-chloro-1-(2,4,5-trichlorophenyl)vinyl dimethyl phosphate by reaction of trimethyl phosphite with 2,2,2',4',5'-pentachloroacetophenone in a mixture of isomeric pentachloroacetophenones the improvement which comprises conducting the reaction at less than 70° C. in a liquid alkane of up to 10 carbons the amount of which ranges between about 14 percent to 65 percent by weight of the reaction mixture.
2. The improvement of claim 1 wherein the alkane contains 5–10 carbon atoms.
3. The improvement of claim 2 wherein the alkane is pentane, hexane or heptane.
4. The improvement of claim 3 wherein the alkane is hexane.
5. The improvement of claim 3 wherein the reaction temperature is 40–70° C.
6. The improvement of claim 4 wherein the reaction temperature is 40–70° C.
7. The improvement of claim 1 wherein the amount of trimethyl phosphite is 100 to 105 percent molar of the amount of the 2,2,2',4',5'-pentachloroacetophenone present.
8. The improvement of claim 6 wherein the amount of trimethyl phosphite is 100 to 105 percent molar of the amount of the 2,2,2',4',5'-pentachloroacetophenone present.

References Cited

UNITED STATES PATENTS

| | | | |
|---|---|---|---|
| 2,956,073 | 10/1960 | Whetstone et al. | 260—969X |
| 3,102,842 | 9/1963 | Phillips et al. | 260—969X |

CHARLES B. PARKER, Primary Examiner

R. L. RAYMOND, Assistant Examiner